May 23, 1967 R. A. FERRARA 3,321,243
SEAT BACK ANGLE ADJUSTMENT MEANS
Filed Oct. 24, 1965
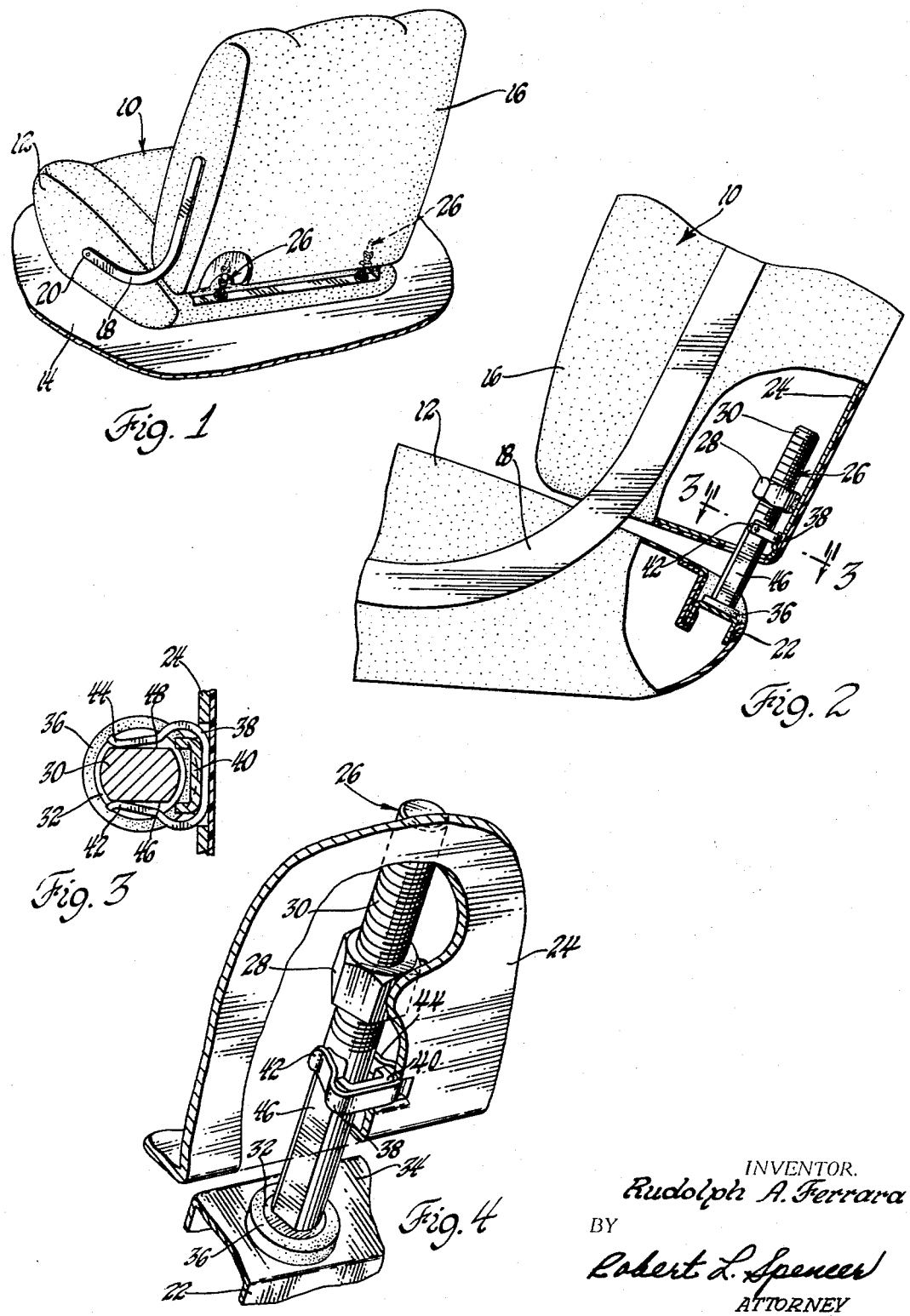
INVENTOR.
Rudolph A. Ferrara
BY
Robert L. Spencer
ATTORNEY

United States Patent Office 3,321,243
Patented May 23, 1967

3,321,243
SEAT BACK ANGLE ADJUSTMENT MEANS
Rudolph A. Ferrara, Warren, Mich., assignor to General Motors Corporation, Detroit, Mich., a corporation of Delaware
Filed Oct. 24, 1965, Ser. No. 504,955
5 Claims. (Cl. 297—378)

This invention relates to a vehicle seating structure having a seat and seat back and more particularly to the means for adjusting the angle of the seat back thereof.

The present trend in vehicle seating is to provide individual bucket seats for the driver and passenger in the front seat of conventional two door motor vehicles. In some instances, six-way seat adjusting is provided for each of the bucket seats whereby fore and aft adjustment, vertical adjustment and tilting adjustment is provided for each seat. Such powered seat adjusters are expensive and conventional manual fore and aft seat adjuster combined with the present invention for changing the angle of the seat back will provide less expensive accommodations for adjusting a bucket seat.

Screw type manually adjustable stops are presently available to adjust the angle of the seat back in a bucket seat or a conventional bench type seat having a pivotable divided back. However, to adjust the screw, a lock nut between the bolt head and bottom of the seat back lower frame is backed away with a wrench from its locked position against the frame and then the bolt can be manually rotated for vertical adjustment of the stop whereby the angle of the seat back is adjusted. There are generally two bolts provided for each seat back thus requiring that each bolt be adjusted the same distance to provide a uniform angle of the seat back in the seat forming position. When the bolts have been adjusted to uniform lengths and the seat is at the desired angle of adjustment the lock nuts must be returned to their locked position against the seat frame to secure the seat bolts in the adjusted position.

It is an object of this invention to provide adjusting bolts for seat backs with spring locking means whereby the bolts may be manually adjusted and the lengths thereof coordinated without visual observation and the inconvenience of releasing a lock nut for adjustments and then tightening the lock nut after the desired adjustment has been made.

Another object of this invention is to provide adjusting bolts and spring retention means that will provide an audible sound for a specific degree of rotation whereby each of the bolts associated with an individual seat back may be uniformly adjusted without visual observation.

These and other objects of the present invention will become more apparent as reference is had to the following specification and drawings wherein:

FIGURE 1 is a perspective view of a bucket seating unit mounted on a portion of a vehicle body, with sections broken away, utilizing the present invention for controlling the adjustment of the seat back.

FIGURE 2 is an enlarged side view of a portion of FIGURE 1 showing the manner in which the adjusting means for the seat back is secured to the seat back frame and contacts the seat frame of the seating unit.

FIGURE 3 is a view in the direction of the arrows, substantially along the line 3—3 of FIGURE 2, illustrating the manner in which the spring means contacts the flat sides of the adjusting bolt to secure it in its adjusted position.

FIGURE 4 is an enlarged view of a portion of FIGURE 1 illustrating the manner in which the adjusting bolt, nut and spring retention means are secured in the seat back and the manner in which the bolt contacts the seat frame for limiting movement of the seat back in one direction.

Referring now to the drawings, as best seen in FIGURE 1, a bucket type seating arrangement, indicated generally by the numeral 10, has a seat member 12 secured to a platform or vehicle floor 14 and a seat back member 16. The seat back 16 is pivotally secured to the seat 12 by a pivot arm 18 which is secured to the seat back 16 and pivotally connected to the seat 12 at pivot connection 20. The seat back 16 may be pivoted forwardly over the seat 12 about pivot connection 20 for storage of the seat unit or for permitting easy entrance to the rear of a two door vehicle.

Referring now to FIGURES 2 through 4, the seat 12 and seat back 16 include a seat frame 22 and a seat back frame 24, respectively, upon which conventional supporting springs, padding and fabric are mounted.

A pair of stop means, indicated generally by the numeral 26, are secured to the seat back frame 24 at the lower portion of the seat back 16 for contacting a bumper or stop pad 34 secured to the seat frame 22 for limiting rotational movement of the seat back in one direction about pivotal connection 20. The stop means 22 on each side of the seat back are identical, therefore, only one will be illustrated and described.

Stop means 26 includes a nut member 28 secured to the seat back frame 24 by welding or other suitable means. A bolt member 30 is threadably positioned in the nut member 28 for longitudinal movement therethrough by rotation thereof. The bolt 30 extends from within the seat back 16 towards the seat 12 and includes a head portion 32 for contacting the stop pad 34 secured to the seat frame 22 by welding or other suitable means. If it is desired, a resilient bumper cap 36 may be positioned over the head portion 32 to cushion the contact between the bolt head and stop pad and reduce noise. The stop means described thus far plus an additional lock nut is typical construction for conventional movable seat backs.

The improvements of this invention consist of a spring member 38 secured to the seat back frame 24 by any suitable manner such as a bracket 40 stamped from the frame 24, as illustrated. In the embodiment shown, the spring member 36 has a pair of arms 42, 44 positioned to be biased into contact with a pair of parallel flat faces 46, 48, respectively, formed on the bolt 30 parallel to the longitudinal axis thereof. The arms 42 and 44 contact the flat faces 46 and 48 to secure the bolt 30 in its positions of adjustment. To change the angle of the seat back 16 in the seat forming position, the bolt 30 is rotated to change its effective length for limiting rotation of the seat back 16 about pivotal connection 20. Each half turn of the bolt from its previously secured position will result in a click or snapping sound emitted as the spring arms 42, 44 come into contact with their respective faces 46, 48. By counting the clicks when the bolt is adjusted, the stop means 26 on each side of the seat back 16 may be moved the same number of turns without visual observation and the seat back will be uniformly adjusted at each corner. Thus, it becomes a simple matter to alter the angle of the seat back by manually rotating one bolt to lengthen or shorten the effective length the desired amount. During such adjusting of the first bolt, the number of clicks is counted and the other bolt is adjusted the same number of clicks thereby assuring that they have been rotated the same number of times and also moved longitudinally the same distance. Normally such adjustment can be readily accomplished without the use of tools as conventional stops now require.

While but one embodiment of this invention has been shown and described, it will be obvious that various modifications may be made without departing from the spirit and scope of the following claims.

I claim:

1. In combination in a vehicle body, a seating unit having a seat secured to said body, a seat back, a pivotal connection connecting said seat back to said seat, said seat back having a folded position pivoted forwardly about said pivotal connection over said seat and a plurality of generally upright seat forming positions, adjustable stop means for limiting rearwardly pivotal movement of said seat back at one of said preselected seat forming positions, preselection of said seat forming position of said seat back being accomplished by adjustment of said stop means, said adjustable stop means including a nut member fixedly secured to said seat back, a bolt member threadably engaging said nut member for longitudinal movement relative thereto by rotational movement of said bolt member, a bumper tab secured to said seat for contacting said bolt member and limiting rotation of said seat back at the preselected seat forming positions, said bolt member having a pair of parallel flat surfaces extending longitudinally thereof and a head portion for contacting said bumper tab, and spring means secured to said seat back and contacting said bolt member for coacting with said flat surfaces for holding said bolt member in the adjusted position.

2. Apparatus as claimed in claim 1 wherein said spring means includes a pair of arms biased into contact with said bolt member, one of said arms contacting one of said flat surfaces and the other of said arms contacting the other of said flat surfaces for holding said bolt member in the adjusted position.

3. In combination on a seating structure having a seat, a seat back, a pivotal connection joining said seat and said seat back for permitting pivotal movement of said seat back relative to said seat, an adjustable stop means for limiting pivotal movement of said seat back in one direction at a plurality of seat forming positions, said stop means includes a nut member secured to said seat back, bolt member threadably engaging said nut member for longitudinal movement relative to said nut member by the rotational movement of said bolt member, a bumper tab secured to said seat for contacting said bolt member at said seat forming positions, and spring means contacting said bolt member for yieldably holding said stop means in selected positions of adjustment.

4. Apparatus as claimed in claim 3 including said bolt member having a flat surface extending longitudinally of said bolt member for cooperating with said spring means for holding said stop means in selected positions of adjustment.

5. Apparatus as claimed in claim 3 including said bolt member having a flat surface extending longitudinally of said bolt member, and a head portion for contacting said bumper tab; and said spring means having an arm biased into contact with said bolt member and positioned on said seat back in contact with said flat surface of said bolt member for yieldably holding said stop means in selected positions of adjustment.

References Cited by the Examiner

UNITED STATES PATENTS

| 781,067 | 1/1905 | Hewitt | 151—48 |
| 1,778,642 | 10/1930 | O'Neil | 151—44 |
| 1,830,119 | 11/1931 | Marshall | 297—378 |
| 2,557,200 | 6/1951 | Pujol | 151—49 |

FOREIGN PATENTS 940,100  10/1963  Great Britain.

DAVID J. WILLIAMOWSKY, *Primary Examiner.*

J. T. McCALL, *Assistant Examiner.*